US006896192B2

(12) United States Patent
Horan et al.

(10) Patent No.: US 6,896,192 B2
(45) Date of Patent: May 24, 2005

(54) SPRAY CAN TARGETING AND POSITIONING SYSTEM

(75) Inventors: Nicholas R. Horan, Cedar Falls, IA (US); Christopher M. Horan, Waterloo, IA (US); Scott J. Horan, Waterloo, IA (US)

(73) Assignee: Laser Touch and Technologies Inc., Cedar Falls, IA (US)

( * ) Notice: Subject to any disclaimer, the term of this patent is extended or adjusted under 35 U.S.C. 154(b) by 268 days.

(21) Appl. No.: 10/057,698

(22) Filed: Jan. 25, 2002

(65) Prior Publication Data

US 2003/0141376 A1 Jul. 31, 2003

(51) Int. Cl.[7] .............................................. B05B 17/00
(52) U.S. Cl. ......................... 239/1; 239/289; 239/333; 239/375
(58) Field of Search ............................. 239/1, 289, 375, 239/333; 222/192, 402.13, 402.15, 113

(56) References Cited

U.S. PATENT DOCUMENTS

| | | | | |
|---|---|---|---|---|
| 4,301,946 A | * | 11/1981 | Goldin et al. | 222/113 |
| 4,401,240 A | * | 8/1983 | Brack | 222/323 |
| 4,515,295 A | * | 5/1985 | Dougherty | 222/113 |
| 4,912,750 A | * | 3/1990 | Foster | 362/114 |
| 5,598,972 A | | 2/1997 | Klein, II et al. | |
| 5,868,840 A | | 2/1999 | Klein, II et al. | |
| 6,052,051 A | * | 4/2000 | Whalen | 340/425.5 |
| 6,390,333 B1 | * | 5/2002 | Bozzo | 222/113 |

* cited by examiner

Primary Examiner—Robin O. Evans
(74) Attorney, Agent, or Firm—Boyle, Fredrickson, Newholm, Stein & Gratz, S.C.

(57) ABSTRACT

A spray container positioning device for use in positioning a spray container relative to a surface, for optimizing application of liquid contained within the spray container to a surface upon discharge of the liquid through a nozzle member associated with the spray container. The positioning device further includes a light beam positioning arrangement which projects at least one light beam toward the surface, for use in positioning the spray container and the nozzle member relative to the surface. The light beam positioning arrangement includes a light beam generator, such as a laser generator, which directs at least one light beam toward the surface to form a point of light on the surface which provides a visual indication to the user as to the position of the spray container and nozzle relative to the surface. In one form, the positioning device includes a handle arrangement selectively engageable with the spray container, which includes a manually operable trigger mechanism engageable with the nozzle member for actuating the nozzle member. The light beam generator may be interconnected with the trigger mechanism, for operating the light beam generator prior to actuation of the nozzle member, to provide an initial indication of the position of the spray container. In another form, the light beam generator is associated with a mounting device adapted for engagement with a side wall defined by the spray container. The light beam generator directs the at least one light beam toward the surface while the liquid contained within the spray container is directed through the nozzle member toward the surface, to provide a continuing point of reference as to the position of the nozzle member during movement of the spray container relative to the surface.

29 Claims, 7 Drawing Sheets

SPRAY CAN TARGETING AND POSITIONING SYSTEM

BACKGROUND AND SUMMARY OF THE INVENTION

This invention relates to spray application of a coating such as paint, and more particularly to a targeting and positioning system for use in combination with a spray coating contained within a pressurized vessel.

Coatings such as paint, primer, lacquer or the like, as well as other liquid products to be applied to a surface, are commonly packaged under pressure in a vessel or container having a depressible nozzle, commonly known as a spray can. This type of coating system is used in large quantities in a wide variety of applications. In a typical construction, the liquid is discharged from the vessel by depressing a nozzle, and pressure from within the vessel discharges the liquid through the nozzle and toward the surface to be coated. When applying coatings in this fashion, the user attempts to position the nozzle at an optimal distance from the surface and move the container in a desired pattern relative to the surface, to apply the coating as efficiently as possible. However, it can be difficult for a user to properly position and move the vessel relative to the surface by eye alone.

A spray can handle assembly has been developed for assisting in applying a liquid to a surface from a spray-type pressurized vessel or container. The spray can handle assembly engages the spray can and typically incorporates a handle and a trigger mechanism, which enables the user to more effectively support the vessel and discharge its contents toward the surface. The handle assembly provides application of the contents from a spray container using similar ergonomic features and motions involved in gun-type spray systems, which are commonly employed in professional environments which seek to maximize efficiency in application and minimize overspray or waste. While a spray can handle assembly of this type provides advantages in supporting the spray container and moving the spray container relative to the surface, the user must still use his or her best judgment in positioning the spray container and nozzle at a distance from the worksurface which optimizes application of the coating or other liquid.

It is an object of the present invention to provide an improved system for applying the contents of a pressurized spray-type container to a surface. It is another object of the invention to provide such a system which is adapted for use in combination with a known handle assembly engageable with a spray container for discharging the contents of the spray container. It is another object of the invention to provide a system which utilizes a proven light beam-type targeting system for optimizing application of a spray coating to a surface. Yet another object of the invention is to provide such a system which is relatively simple in its components and operation, yet which provides significant advantages in application of a coating to a surface.

In accordance with the invention, a targeting and positioning system is adapted for use in combination with a spray-type container. Broadly, the targeting and positioning system includes an attachment arrangement adapted to be secured to the container, and a light beam generator interconnected with the attachment arrangement for directing a light beam onto the surface. In one form, the targeting and positioning system may be adapted for use in conjunction with a handle assembly engageable with the container, such that the handle assembly makes up the attachment arrangement. The handle assembly includes a manually engageable handle adapted to be grasped by the user for supporting the spray container, and a movable trigger located adjacent the handle. The trigger is a part of an operating arrangement engageable with the nozzle of the spray container, for depressing the nozzle and discharging the contents of the container upon movement of the trigger. In another form, the attachment arrangement may simply be a spray can attachment device to which the light beam generator is mounted. The spray can attachment device is releasably engageable with the spray can, for selectively securing the light beam generator to the spray can.

The light beam generator functions to generate a light beam that is directed toward the surface, either continuously or selectively when the nozzle of the spray container is depressed to discharge the contents of the container toward the surface. The light beam generator emits at least one light beam toward the surface, and the light beam is utilized by the operator to position the container relative to the surface so as to maximize efficiency in application of the contents of the container to the surface. In one form, the light beam generator emits a pair of convergent light beams which intersect each other at a predetermined distance, which is selected according to the distance of the spray container from the surface which provides optimal application of the coating to the surface. The user positions the spray can so as to maintain a single point of the light on the surface while moving the container to apply the coating to the surface, so as to apply the contents of the container at the optimal distance from the surface. The convergent light beams thus provide a constant guide for the user in targeting and positioning the spray container during discharge of the coating from the container.

The light beam generator may be in the form of a light beam generator housing that is adapted to be selectively mounted to the exterior of the spray can using the attachment arrangement, in combination with a power supply and actuator arrangement. In the handle version, the power supply and actuator arrangement may be located within an interior defined by the handle assembly. Alternatively, the power supply may be located within the light beam generator housing itself, and an external actuating switch may be interconnected with the housing.

In the handle version, the actuator arrangement is preferably operable so as to actuate the light beam generator upon an initial movement of the trigger arrangement before the trigger arrangement is moved an amount sufficient to depress the nozzle and discharge the contents of the container. This allows the operator to initially move the container to a desired position relative to the surface, after which the trigger mechanism is manipulated to depress the nozzle and discharge the contents of the container. The actuator arrangement may include a switch positioned so as to be engageable by a movable member forming a part of the trigger mechanism, for actuating the light beam generator upon movement of the trigger mechanism.

The light beam generator may be a laser beam generator located within a generator housing mounted to the attachment arrangement. In some embodiments, the generator housing may be moved to varying positions on the housing according to a preferred orientation of the light beams directed toward the surface. The generator housing includes a transparent window through which the light beams are emitted, and which serves to protect and enclose the interior of the generator housing. In the handle version, the light beam generator can be constructed to work in conjunction with the handle assembly so as to provide similar operation of the handle assembly as in the prior art, but incorporating the advantages offered by the light beam targeting and positioning system for optimizing application of the coating to the surface. In an alternative form, the spray can attachment device and the light beam generator may be a separate assembly constructed to minimize size and weight for ease of use.

The invention also contemplates a method of positioning a spray container relative to a surface, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
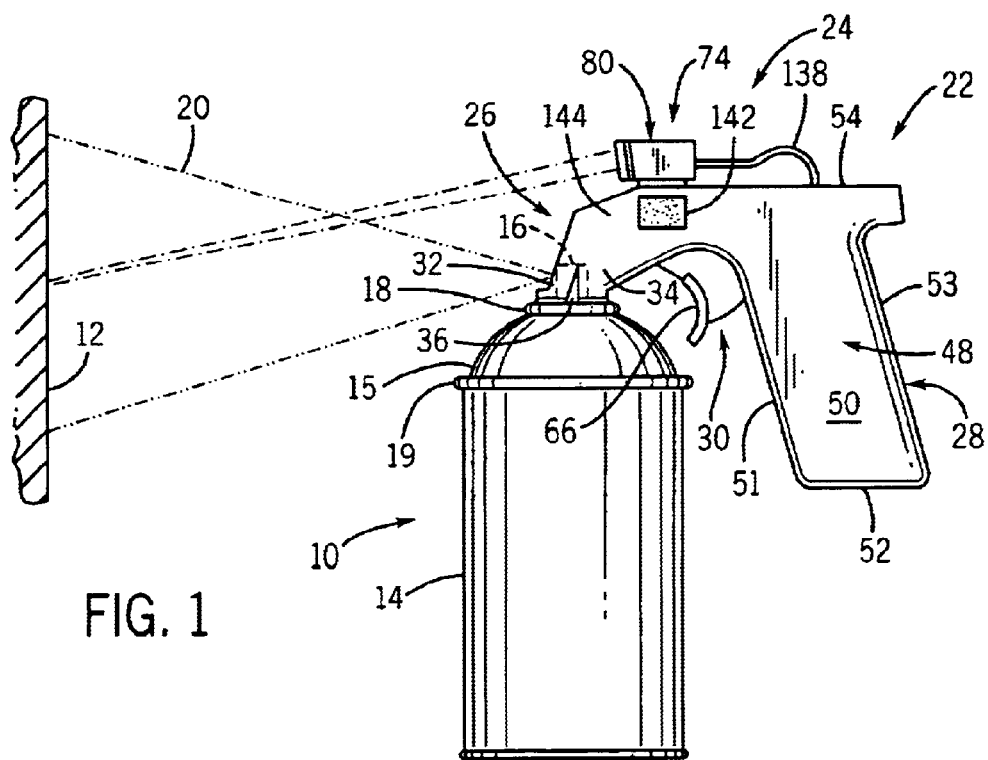
FIG. 1 is a side elevation view of a spray container and a handle assembly version of the targeting and positioning system of the present invention.

FIG. 1 illustrates a first embodiment of the present invention. In a known manner, a conventional spray-type vessel or container 10 contains a liquid under pressure adapted to be applied to a surface 12. The container 10 includes a container body defined by a cylindrical lower portion having a side wall 14 and a domed top wall 15, in combination with an outwardly biased, depressible nozzle 16. An upper rim 18 is located at the upper end of domed top wall 15, and a lower rim 19 is located between side wall 14 and top wall 15. Container 10 is of conventional construction, and depression of nozzle 16 results in the pressurized contents of container 10 being discharged through nozzle 16 in a generally conical spray pattern, shown at 20, for applying the contents of spray container 10 to surface 12. Spray container 10 may contain any type of liquid which may be a coating such as paint, lacquer, primer or other types of coatings as are well known.

A handle assembly, shown generally at 22, is adapted for engagement with spray container 10. In accordance with the invention, handle assembly 22 incorporates a light beam targeting and positioning system, shown generally at 24.

Handle assembly 22 is generally constructed in a manner as is known, and may be a spray container handle assembly such as is available under the designation CAN GUN. Handle assembly 22 includes a forward container mounting section 26, a rearward handle section 28, and a trigger mechanism 30.

Figure 2:
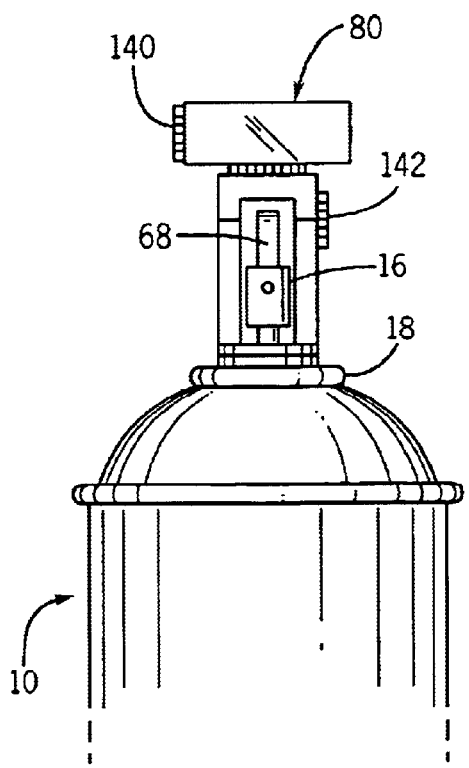
FIGS. 2 and 3 are partial front elevation views showing an upper portion of the spray container, handle assembly and light beam-type targeting and positioning system of FIG. 1, showing the light beam generator housing in different positions relative to the handle assembly.
Figure 3:
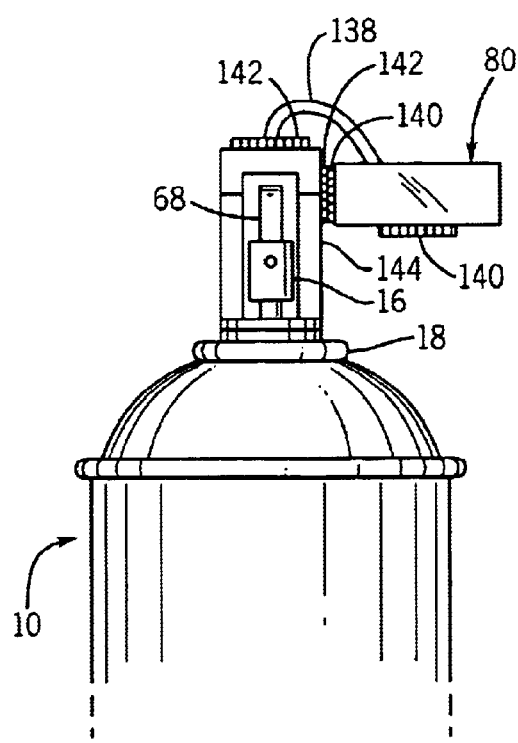
Figure 4:
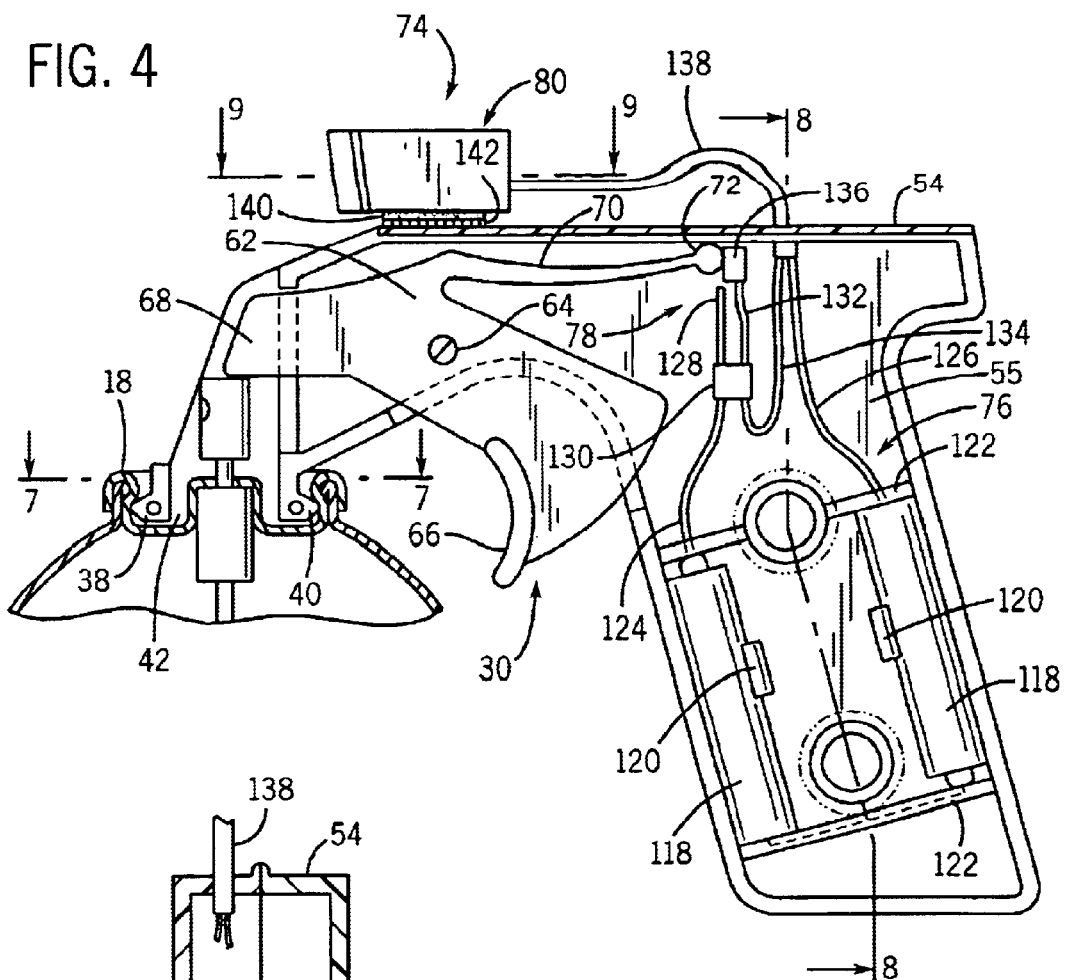
FIG. 4 is a partial section view of the spray container, handle assembly and targeting and positioning system of FIG. 1, showing the trigger mechanism of the handle assembly in an inoperative position.
Figure 7:
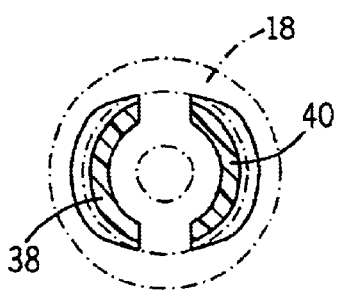
FIG. 7 is a section view taken along line 7—7 of FIG. 4.

As shown in FIGS. 1, 4 and 7, container mounting section 26 extends forwardly from handle section 28, and includes depending front and rear legs 32, 34, respectively, separated by a space 36. Legs 32, 34 terminate in arcuate outward flanges 38, 40, respectively, which are received within a recess 42 located at the top of container 10. Flanges 38, 40 are engageable with container rim 18 in a snap fit manner, in which legs 32, 34 flex toward each other by virtue of space 36 and thereafter provide an outward bias away from each other to engage flanges 38, 40 with the underside of rim 18, to temporarily mount handle assembly 22 to container 10. Container mounting section 26 is defined by a pair of side walls 44 (FIG. 2), between which an open area 46 is located and within which nozzle 16 is received when container mounting section 26 is engaged with container 10.

Figure 8:
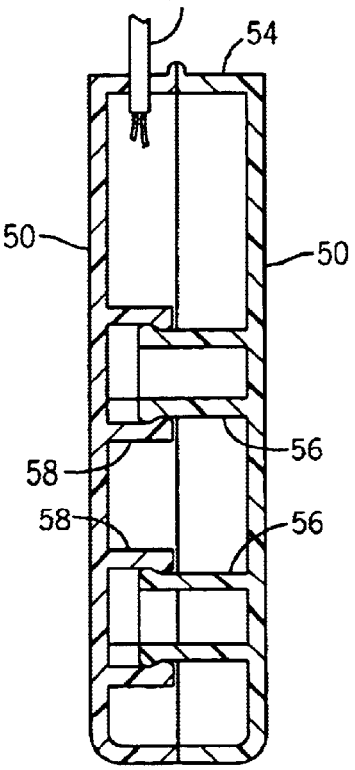
FIG. 8 is a section view taken along line 8—8 of FIG. 4.

Handle section 28 of handle assembly 22 includes a hand grip area 48 formed by a pair of side walls 50, a front wall 51, a bottom wall 52, a rear wall 53 and a top wall 54, all of which cooperate to define an internal cavity 55 (FIG. 4). Handle assembly 22 is generally of a clamshell-type construction, wherein a pair of handle assembly half sections are interconnected together. As shown in FIG. 8, one of side walls 50 may include a pair of inwardly extending engagement bosses 56, and the other of side walls 50 may include inwardly extending receivers 58. Engagement bosses 56 are engaged within receivers 58 in a snap-fit manner, for securing the halves of handle assembly 22 together.

Trigger mechanism 30 includes a trigger body 62 which is pivotably mounted within the interior of the handle assembly 22 via a pivot pin 64. Trigger body 62 includes a finger engagement area 66 located rearwardly of pivot pin 64, and a nozzle engagement member 68 located forwardly of pivot pin 64. A spring finger 70 extends rearwardly from trigger body 62, and terminates in a rearward enlarged end 72 which engages the inside surface of top wall 54. Trigger body 62 and spring finger 70 are constructed and arranged such that engagement of spring finger end 72 with top wall 54 biases trigger body 62 in a clockwise direction about pivot pin 64, to bias nozzle engagement member 68 upwardly and finger engagement area 66 forwardly.

With the above-described components and construction, handle assembly 22 is releasably engaged with spray container 10. To operate handle assembly 22, the user grasps handle section 28 for supporting spray container 10 at a distance from the worksurface, such as surface 12, and uses a finger to apply a rearward force to finger engagement area 66 and pivot trigger mechanism 30 in a counterclockwise direction against the force of spring finger 70, to move nozzle engagement member 68 downwardly. Such movement of nozzle engagement member 68 depresses nozzle 16 of spray container 10, to discharge the contents of spray container 10 toward surface 12. When manual pressure on finger engagement area 66 is relieved, nozzle 16 moves upwardly in a known manner and spring finger 70 functions to pivot trigger mechanism 30 in a clockwise direction so as to move finger engagement area 66 forwardly and nozzle engagement member 68 upwardly.

Figure 9:
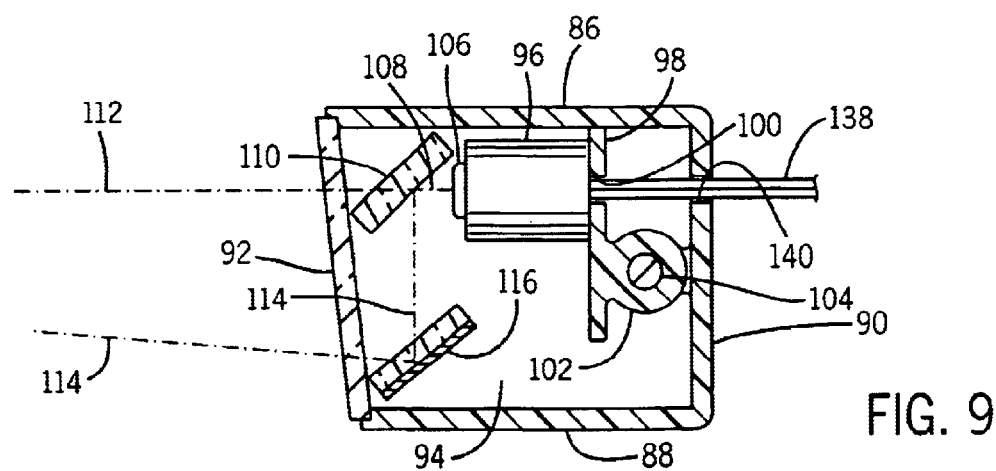
FIG. 9 is a section view taken along line 9—9 of FIG. 4.

Handle assembly 22 is modified to incorporate light beam positioning system 24, which includes a light beam emitter 74, a power supply 76 and an actuator arrangement 78. As shown in FIGS. 4 and 9, light beam emitter 74 includes a housing 80 defined by a series of walls including a top wall 82, a bottom wall 84, side walls 86 and 88, a rear wall 90 and a translucent front window or wall 92. Walls 82–92 cooperate to define an internal cavity 94. A light beam generator 96 is located within internal cavity 94. Light beam generator 96 is preferably a laser beam generator, which emits a colored laser beam having a wavelength of approximately 635–670 nM. Light beam generator 96 may be a laser beam generator such as is manufactured by EUBON Technology of Talchung Hsien, R.O.C. under its Model No. LM-03, although it is understood that other satisfactory laser or light beam generators may be employed. Light beam generator 96 is secured to an upstanding support wall 98 located within internal cavity 94. Support wall 98 includes an opening 100, and may be formed integrally with a mounting boss 102 adapted to receive a mounting stud 104 depending from top wall 82, for engaging top wall 82 with side walls 86, 88, rear wall 90 and front wall 92 so as to enclose internal cavity 94.

Light beam generator 96 includes a forwardly facing emitter head 106 which emits a concentrated laser-type light beam 108. An angled partially reflective translucent splitter member 110 is located forwardly of emitter 106. Splitter member 110 functions to split light beam 108 into a pair of light beams 112, 114 within internal cavity 94. Light beam 112 passes through splitter member 110 and through translucent front wall 92, so as to project linearly in a forward direction from housing 80. Split beam 114 is directed transversely across internal cavity 94 toward an angled mirror 116, which redirects light beam 114 so as to project light beam 114 forwardly through translucent front wall 92 in a direction forwardly of housing 80. Splitter member 110 is preferably formed of a combination reflective and translucent material such as is available from Precision Glass & Optics of Santa Ana, Calif. Mirror 116 is a conventional mirror member constructed of a material such as Front Surface Polish Mirror available from Precision Glass & Optics of Santa Ana, Calif.

Splitter member 110 and mirror 116 are positioned within internal cavity 94 such that split beams 112, 114 converge toward each other forwardly of housing 80 at a predetermined angle relative to each other, for reasons to be explained.

Power supply 76 includes a pair of batteries 118 retained in position by a pair of clips 120. The contact ends of batteries 118 are engaged with contact plates 122 secured within internal cavity 55 of handle section 28. Leads 124, 126 extend from battery contact plates 122. Actuator arrangement 78 is in the form of a switch, having a stationary contact 128 mounted to a block 130 and connected to lead 124, in combination with a movable contact 132, mounted to block 130 and connected to a lead 134. Movable contact 132 includes a contact head 136, and is configured and mounted to block 130 so as to be biased toward stationary contact 128. Exteriorly of internal cavity 94, leads 126, 134 are contained within a sheath 138, which is fixed to top wall 54. As shown in FIG. 9, leads 126, 134 extend through an opening 140 in rear wall 90 of light beam generator housing 80, and through opening 100 in support wall 98 for connection to light beam generator 96, for establishing the supply of power from batteries 118 through actuator arrangement 78.

In operation, the user employs handle assembly 22 in combination with light beam targeting and positioning system 24 to spray a coating or the like from container 10 onto surface 12.

Initially, the user engages handle assembly 22 with container 10 as described above, and grasps handle section 28 without depressing trigger mechanism 30 so as to move container 10 to a ready position in preparation for spraying surface 12. When trigger mechanism 30 is not depressed, as shown in FIG. 4, end 72 of spring finger 70 is in engagement with contact head 136 of movable contact 132, which maintains movable contact 132 out of engagement with stationary contact 128. When contacts 128, 132 are separated in this manner, no power is supplied from batteries 118 to light beam emitter 74, and light beam generator 96 is rendered inoperative.

When it is desired to spray the contents of container 10, the user first ensures that handle assembly 22 is properly positioned relative to container 10. To do this, the user manually rotates handle assembly 22 on container 10 such that light beams 112, 114 converge on surface 12 at the center of spray pattern 20 when container 10 is spaced an optimum distance from surface 12. As noted previously, the convergence distance of light beams 112, 114 corresponds to the distance of container 10 from surface 12 that provides optimal application of the spray coatings to maximize efficiency in application and minimize waste and overspray.

Figure 5:
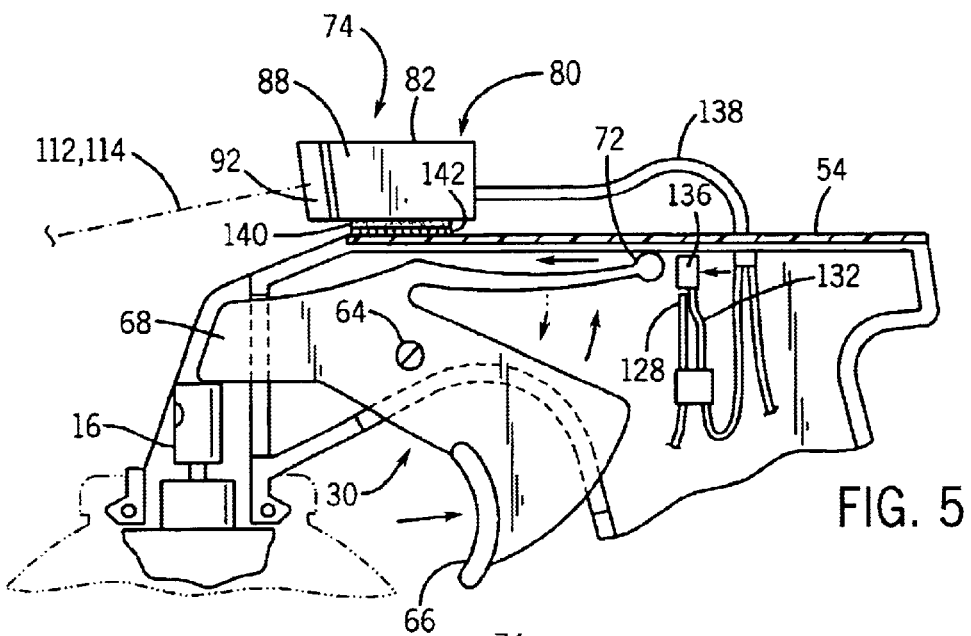
FIG. 5 is a view similar to FIG. 4, showing initial movement of the trigger mechanism so as to actuate the targeting and positioning system prior to depression of the spray can nozzle.
Figure 6:
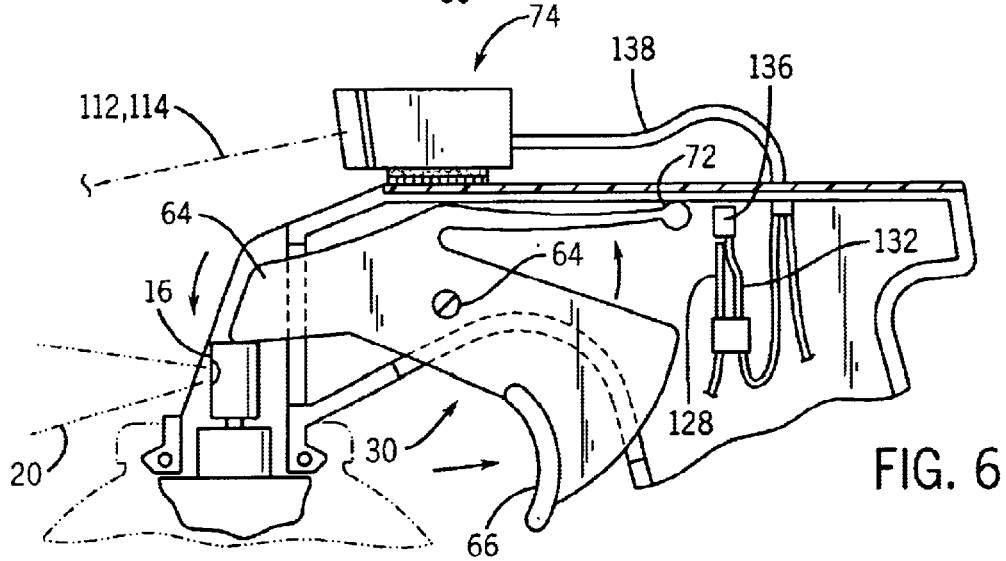
FIG. 6 is a view similar to FIGS. 4 and 5, showing movement of the trigger mechanism an amount sufficient to depress the nozzle so as to discharge the contents of the spray container toward the surface.

After properly positioning handle assembly 22, operation commences by the user exerting light finger pressure on finger engagement area 66 to slightly rotate trigger mechanism 30 about pivot pin 64, to an initial position as shown in FIG. 5. When trigger mechanism 30 is in this position, the counterclockwise movement of trigger mechanism 30 about pivot pin 64 moves end 72 of spring finger 70 forwardly along the inside surface of top wall 54 and also moves nozzle engagement member 68 downwardly into initial engagement with nozzle 16. In this position, the downward movement of nozzle engagement member 68 is insufficient to depress nozzle 16 so as to commence to discharging the contents of container 10 through nozzle 16. The forward movement of spring finger end 72 allows the bias of movable contact member 132 to move contact member 132 forwardly into engagement with stationary contact member 128, to complete the power supply circuit and to supply power to light beam generator 96. The supply of power to light beam generator 96 in this manner functions to generate split light beams 112, 114, which pass through translucent front wall 92 of housing 80 as shown in FIG. 9. As noted previously, split light beams 112, 114 converge at a predetermined angle in a direction toward surface 12. The user manually manipulates handle assembly 22 so as to move spray container 10 to a position in which split light beams 112, 114 converge to form a single point of light on surface 12. Spray container 10 is then positioned at the optimal distance from surface 12, and the user then further depresses trigger mechanism 32 to a spray position as shown in FIG. 6, wherein nozzle engagement member 68 is moved downwardly an amount sufficient to depress nozzle 16 so as to discharge the contents of container 10 in spray pattern 20 onto surface 12.

During application of the coating from spray container 10 onto surface 12, light beam generator 96 continues to emit split light beams 112, 114 as described, which are sufficiently intense so as to provide visibility of the points of light on surface 12 from light beams 112, 114 during application of the spray coating onto surface 12. The user maintains spray container 10 at its optimal distance from surface 12 by maintaining spray container 10 parallel to surface 12 and light beam generator 96 such that split light beams 112, 114 converge together into a single point of light at the center of spray pattern 20 when spray container 10 is moved relative to surface 12. In this manner, split light beams 112, 114 provide a visual reference as to the optimal distance of spray container 10 relative to surface 12, to maximize efficiency and minimize waste in application of the spray coating onto surface 12.

To cease spraying, the user relieves pressure on trigger mechanism 30, and the biasing force of spring finger 70 functions to rotate trigger mechanism 30 in a clockwise direction to lift nozzle engagement member 68 and to slide end 72 of spring finger 70 rearwardly along the inside surface of top wall 54. When finger pressure on finger engagement area 66 is fully relieved, spring finger end 72 returns to its FIG. 4 position into engagement with head 136 of movable contact 132, to separate movable contact 132 from stationary contact 128 and cut off the supply of power to light beam generator 96.

Housing 80 may be secured to handle assembly 22 in a manner providing either a fixed position or variable position mounting of housing 80. As shown, a hook and loop connection arrangement may be interposed between housing 80 and top wall 54, including mating hook and loop strips 140, 142 mounted to housing bottom wall 84 and handle top wall 54, respectively. A second strip 142 may be mounted to the side wall of handle assembly 22, shown at 144, between container mounting section 26 and handle section 28. A second strip 140 is mounted to housing side wall 86 and is engageable with second strip 142 as shown in FIG. 3. With this arrangement, housing 80 can be moved to different positions relative to handle assembly 22, to adjust the elevation of split light beams 112, 114 so as to accommodate different spray patterns 20.

Light beam splitter member 110 and mirror 116 are illustrated as fixed in position, to provide a fixed convergence distance for split light beams 112, 114. It is also contemplated to vary the angle of mirror 116 so as to vary the angle of convergence of split light beams 112, 114, and thereby the distance from spray container 10 at which beams 112, 114 converge together, to adjust the light beam convergence point corresponding to optimum application of the coating from container 10. A system for generating dual converging light beams for use with a gun-type spray system is fully disclosed in Klein et al. U.S. Pat. No. 5,598,972 issued Feb. 4, 1997, the disclosure of which is hereby incorporated by reference. The patent includes disclosure of an adjustment feature for varying the distance of convergence of the split light beams, which may be incorporated into light beam emitter 74 of the present invention.

In addition, light beam generator 96 is disclosed as being contained within a housing, such as 80, which is movable and separate from the structure of handle assembly 22. It is also understood that a light beam generator may be permanently secured inside the structure of the spray container handle assembly, and need not be contained within a separate housing as shown.

Further, housing 80 may be permanently secured in a desired position on handle assembly 22, rather than variable positions as shown and described. In a variable position mounting arrangement, any type of complimentary mating engagement structure may be interposed between housing 80 and handle assembly 22 in place of the hook and loop mounting arrangement, such as but not limited to a tab and slot mounting arrangement, a snap-fit engagement arrangement, or any other type of releasable engagement structure. In addition, light beam generator 96 may be contained within the internal cavity 55 of handle assembly 22, and the laser beam(s) generated by light beam generator 96 may be communicated exteriorly of handle assembly 22 by fiber optic media or the like. An arrangement of this type is shown and described in Klein et al U.S. Pat. No. 5,868,840, the disclosure of which is hereby incorporated by reference.

FIGS. 10–13 illustrate alternative embodiments of the present invention, and like reference characters will be used where possible to facilitate clarity. In the alternative embodiments, light beam targeting and positioning system 24' is not associated with a handle assembly such as 22. Rather, light beam system 24' is attached to spray container 10 with an independent attachment device, shown generally at 150. This embodiment has a reduced number of components and does not require assembly into another type of attachment, such as handle assembly 22, and can thus be produced at a relatively low cost and sold as a separate, stand-alone attachment.

As shown in FIGS. 10 and 11, light beam targeting and positioning system 24' is attached to spray container 10 by attachment device 150, which generally includes a base 152 having an upwardly extending arm 154 to which a light beam generator 156 is mounted, in combination with a flexible retaining strap 158.

Base 152 includes a central section 160 and a pair of base arms 162 extending laterally in opposite directions from central section 160. Arm 154 extends upwardly from central section 160, and is oriented perpendicularly to base arms 162. Upwardly extending arm 154 includes a lip 164 formed on its inner surface, which is adapted to engage rim 19 defined by container 10, and which functions to position attachment device 150 in a predetermined position relative to the longitudinal axis of container 10 when attachment device 150 is secured to container 10.

Base 152 defines an arcuate configuration, having a curvature which corresponds to the radius of container side wall 14. Base arms 162 are thus adapted to be placed against container side wall 14, to partially encircle container side wall 14. Flexible retaining strap 158 extends between the ends of base arms 162, so as to secure attachment device 150 to container 10. Retaining strap 158 may be in the form of an elastic band connected between rings 166, each of which is mounted to the end of one of base arms 162. Alternatively, flexible retaining strap 158 may be in the form of a strap fixed at one end to one of rings 166, looped through the opposite ring 166 and provided with a releasable connection system, such as mating hook and loop fasteners, for selectively fixing base 152 to container 10. It is understood, however, that any satisfactory type of releasable connection arrangement may be provided, and is not limited to the specific configuration of strap 158 and base 152 as shown and described. For example, it is also contemplated that flexible retaining strap 158 may be eliminated altogether, and magnets embedded in the material of base 152 so as to magnetically secure base 152 to container 10.

Light beam generator 156 is connected to the upper end of upwardly extending arm 154 via a pivot connection, shown at 168. With this construction, light beam generator 156 can be pivoted about a pivot axis perpendicular to the longitudinal axis of upwardly extending arm 154, to vary the angle at which light beams 112, 114 are directed relative to container 10, and thereby spray pattern 20.

Light beam generator 156 may be constructed such that light beams 112, 114 converge together at a distance from spray container 10 that corresponds to a known optimal distance for optimizing application of the spray coating from spray container 10 onto surface 12. Alternatively, light beam generator 156 may be provided with an adjustment mechanism for adjusting the angle of convergence of light beams 112, 114. Light beam generator 156 has a conventional ON/OFF switch, which is positioned so as to be readily accessible by the user for turning light beam generator 156 on and off.

In operation, the embodiment of FIGS. 10 and 11 functions as follows to position spray container 10 relative to surface 12. The user first secures light beam targeting and positioning system 24' to spray container 10 by engaging base 152 with spray container side wall 14 such that lip 164 engages lower rim 19 of spray container 10. Flexible retaining strap 158 is then manipulated to engage spray container side wall 14. In an embodiment in which flexible retaining strap 158 is an elastic band, the elastic band is stretched over lower rim 19 and allowed to contract against container side wall 14. In an embodiment in which flexible retaining strap 158 is a strip of material with a releasable fastening arrangement, the free end of the strip is pulled so as to tighten the portion of the strip between rings 166, and the releasable fastening arrangement is engaged so as to firmly secure base 152 to spray container 14. Base 152 is positioned such that light beam generator 156 points slightly inwardly relative to the spray direction for spray container nozzle 16. In this manner, light beams 112, 114 are directed into the spray pattern 20, such that the points at which light beams 112, 114 impinge on surface 12 are within spray pattern 20. The user can thus easily view the impingement points of light beams 112, 114 on surface 12 through spray pattern 20, to position spray container 10 at the optimal distance from surface 12.

The user can vertically adjust the light beam impingement points by pivoting light beam generator 156 relative to arm 154 using pivot connection 168. In addition, the user can laterally adjust the light beam impingement points by either rotating nozzle 16 relative to spray container 10, or rotating light beam targeting and positioning system 24' on spray container 10. These adjustment steps are preferably undertaken by application of the spray coating from spray container 10 onto a test surface. Once proper position of light beam targeting and positioning system 24' on spray container 10 is attained, the user can then actuate light beam generator 156 for use in maintaining spray container 10 at the distance from surface 12 that provides optimal application of the spray coating to surface 12. To do so, the user maintains spray container 10 in a position such that light beams 112, 114 converge into a single point of light on surface 12, during movement of spray container 10 relative to surface 12.

Figure 10:
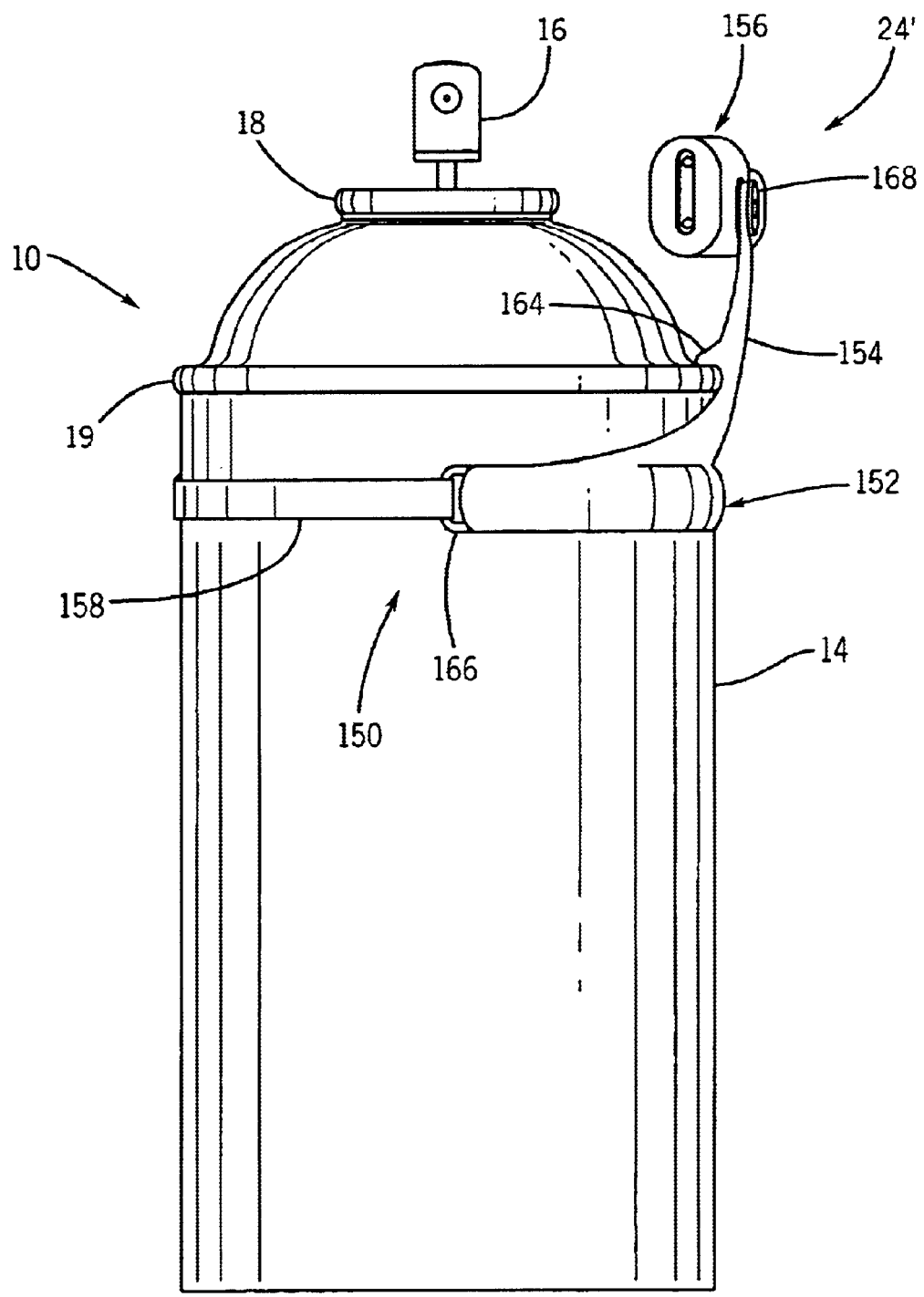
FIG. 10 is a front elevation view of an alternative embodiment of the present invention incorporating an attachment device for mounting the light beam generator to the spray can.
Figure 11:
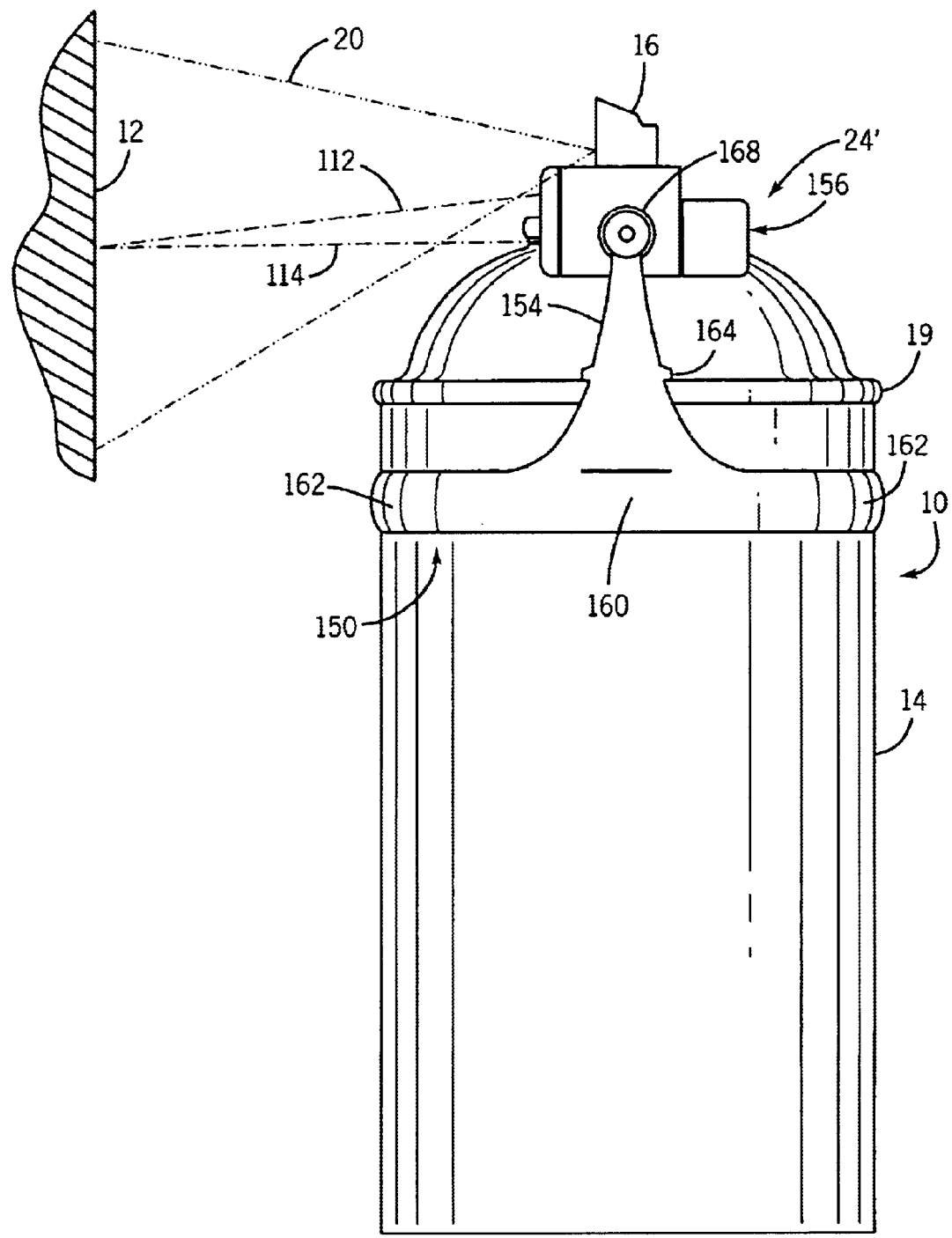
FIG. 11 is a side elevation view of the embodiment shown in FIG. 10.
Figure 12:
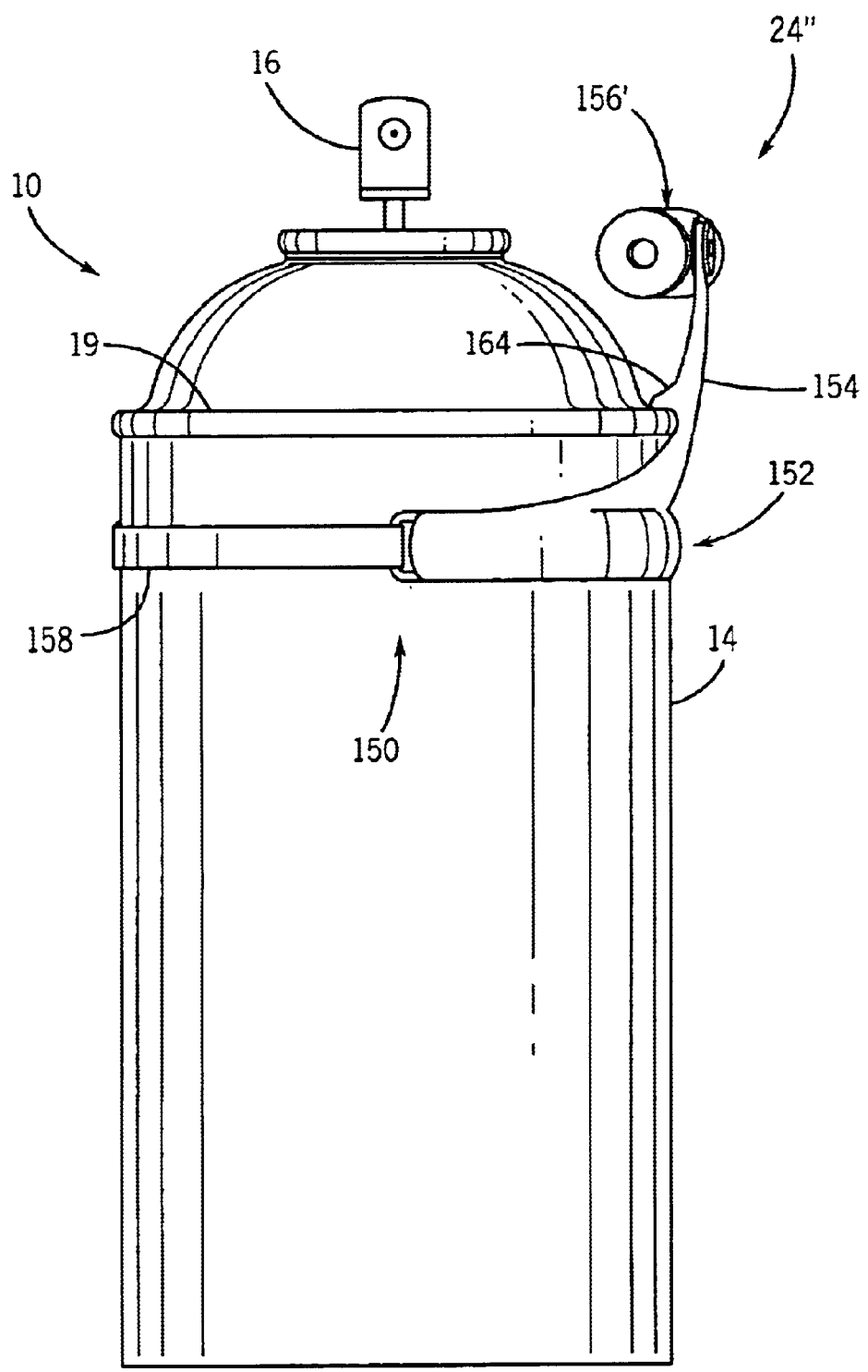
FIG. 12 is a front elevation view of an embodiment similar to that shown in FIGS. 10 and 11 but utilizing a single light beam.
Figure 13:
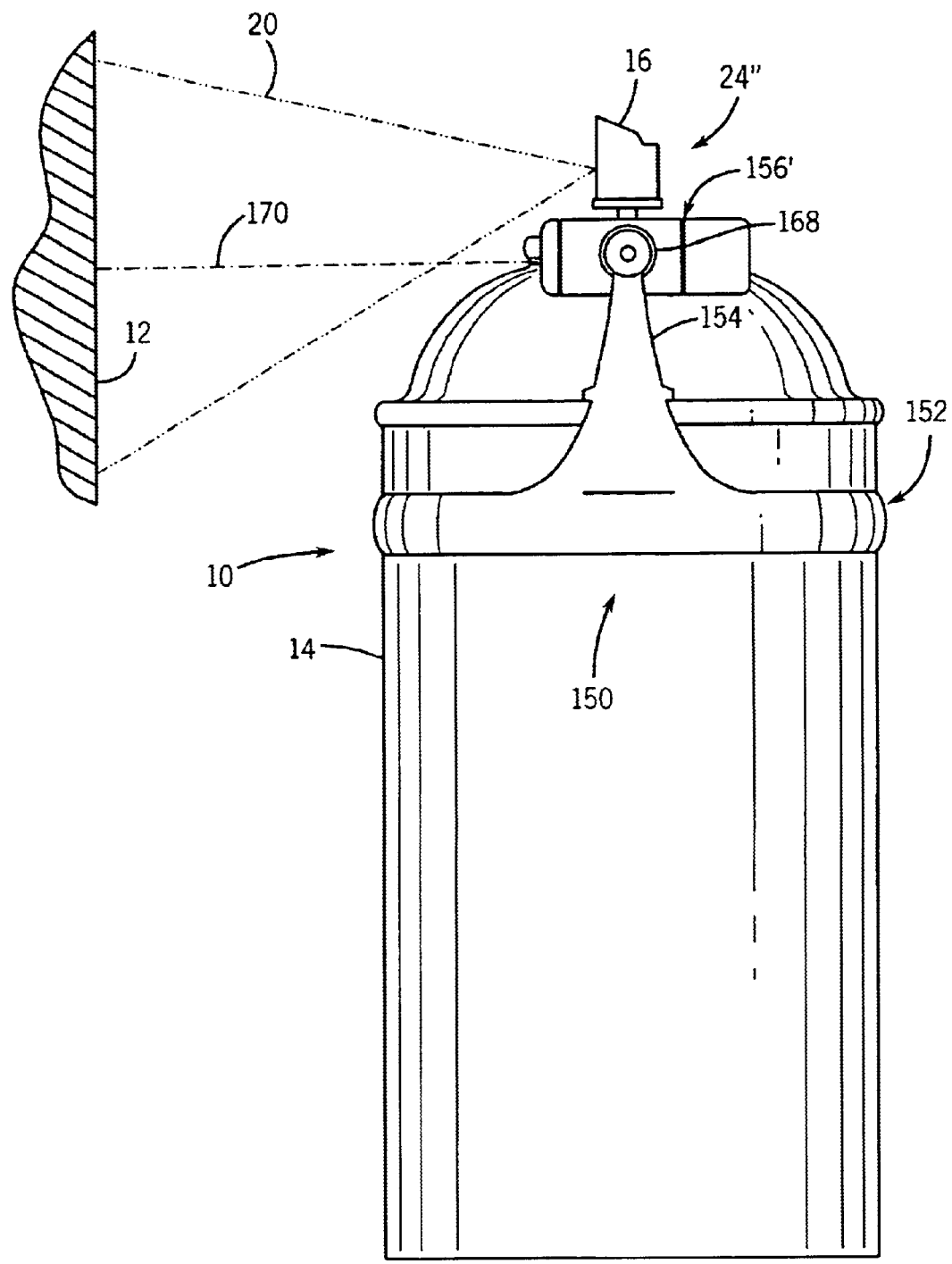
FIG. 13 is a side elevation view of the embodiment shown in FIG. 12.

FIGS. 12 and 13 illustrate another embodiment of the invention, similar to that illustrated in FIGS. 10 and 11, and like reference characters will be used where possible to facilitate clarity. In this embodiment, light beam targeting and positioning system 24" includes attachment device 150 in the same manner as described with respect to FIGS. 10 and 11, including base 152 and flexible retaining strap 158. Light beam generator 156' is pivotably mounted to the upper end of arm 154 via pivot connection 168. Light beam generator 156' emits a single light beam 170 rather than the dual converging light beams 112, 114 of light beam generator 156. In this embodiment, the user adjusts the position of light beam targeting and positioning system 24" such that light beam 170 strikes surface 12 at the center of spray pattern 20. During application of the spray coating onto surface 12, the user manually positions spray container 10 such that light beam 170 is maintained in the center of spray pattern 20 as spray container 10 is moved relative to surface 12, to provide optimal application of the spray coating from spray container 10 onto surface 12.

In this version (as in the prior version), the position of light beam generator 156' is first adjusted by placing spray container 10 on a horizontal supporting surface at a known distance from a test surface 12, and then quickly depressing and releasing nozzle 16 to form a circular pattern of the spray coating on the test surface 12. While spray container 10 is maintained at the predetermined distance from test surface 12, the position of light beam targeting and positioning system 24" is adjusted so that light beam 170 strikes test surface 12 in the center of the circular pattern applied to test surface 12. The predetermined distance of spray container 10 from test surface 12 is that which corresponds to optimal application of the spray coating from spray container 10 onto a surface, and the user simply positions spray container 10 at the predetermined distance from test surface 12 by measurement. Once the proper position of light beam targeting and positioning system 24" on spray container 10 is attained, the user actuates light beam generator 156' as before, and maintains the point of impingement of light beam 170 in the center of spray pattern 20 during movement of spray container 10 relative to the actual worksurface 12, to provide optimal application of the spray coating to surface 12.

The approach to utilization of a single light beam in spray coating application is shown and described in copending application Ser. No. 10/103,498 filed Mar. 20, 2002, the disclosure of which is hereby incorporated by reference.

It can thus be appreciated that the present invention provides a relatively simple and effective mechanism for maintaining proper position of a conventional spray coating container relative to a worksurface, to optimize application of the coating to the surface. This provides optimal application of the coating to the surface, while minimizing waste and discharge of harmful vapors into the air. As shown, the invention can be used both in a trigger-type handle assembly or as a stand-alone attachment, and in either case provides highly satisfactory operation in optimizing application of the spray coating onto the surface.

Various alternatives and embodiments are contemplated as being within the scope of the following claims particularly pointing out and distinctly claiming the subject matter regarded as the invention.

We claim:

1. A spray container positioning device for use in positioning a spray container relative to a surface, wherein the spray container includes a nozzle that directs a spray onto a surface in a spray pattern, comprising:

a light beam positioning arrangement for projecting at least one light beam toward the surface, for use in positioning the spray container and nozzle member relative to the surface, wherein the light beam positioning arrangement includes a light beam generator that generates a linear light beam; and a spray container mounting structure in association with the light beam positioning arrangement, wherein the spray container mounting structure is configured to support the light beam positioning arrangement on the spray container;

wherein the spray container mounting structure and the light beam positioning arrangement are configured such that the linear light beam from the light beam generator is directed toward the surface within the spray pattern, wherein the linear light beam defines a point of light within the spray pattern upon striking the surface to provide a reference point for the user in determining the position of the spray container relative to the surface.

2. The device of claim 1, wherein the light beam positioning arrangement includes an actuator arrangement for selectively operating the light beam generator.

3. The device of claim 2, wherein the light beam generator is contained within a housing and the actuator arrangement comprises a switch associated with the housing.

4. The device of claim 2, wherein the spray container mounting structure comprises:

a handle arrangement adapted for selective engagement with the spray container; and a manually operable trigger arrangement moveably mounted to the handle arrangement, wherein the trigger arrangement includes a manually engageable trigger area and a nozzle engagement member for operating the nozzle member in response to movement of the trigger area.

5. A spray container positioning device for use in positioning a spray container relative to a surface, comprising:

a light beam positioning arrangement for projecting at least one light beam toward the surface, for use in positioning the spray container and nozzle member relative to the surface, wherein the light beam positioning arrangement includes a light beam generator and an actuator arrangement for selectively operating the light beam generator; and a spray container mounting structure in association with the light beam positioning arrangement adapted for supporting the light beam positioning arrangement on the spray container, wherein the spray container mounting structure comprises a handle arrangement adapted for selective engagement with the spray container, and a manually operable trigger arrangement moveably mounted to the handle arrangement, wherein the trigger arrangement includes a manually engageable trigger area and a nozzle engagement member for operating the nozzle member in response to movement of the trigger area;

wherein the actuator arrangement is interconnected with the trigger arrangement for operating the light beam generator upon movement of the trigger arrangement so as to operate the nozzle member.

6. The device of claim 5, wherein the trigger arrangement includes a movable member and the actuator arrangement includes a movable contact which moves in response to movement to the movable member of the trigger arrangement for selectively actuating the light beam generator.

7. The device of claim 6, wherein the actuator arrangement is responsive to movement of the manually operably trigger arrangement for generating at least one light beam when the nozzle engagement member is moved so as to operate the nozzle member.

8. The device of claim 4, wherein the handle arrangement includes a housing defining an internal cavity, and further comprising a power supply located within the internal cavity of the housing.

9. The device of claim 7, wherein the housing is engageable in varying positions on the handle arrangement for varying the position of the at least one light beam relative to the spray container.

10. A spray container positioning device for use in positioning a spray container relative to a surface, comprising:

a light beam positioning arrangement for projecting at least one light beam toward the surface, for use in positioning the spray container and nozzle member relative to the surface, wherein the light beam positioning arrangement includes a light beam generator and an actuator arrangement for selectively operating the light beam generator; and a spray container mounting structure in association with the light beam positioning arrangement adapted for supporting the light beam positioning arrangement on the spray container, wherein the spray container mounting structure comprises a handle arrangement adapted for selective engagement with the spray container, and a manually operable trigger arrangement moveably mounted to the handle arrangement, wherein the trigger arrangement includes a manually engageable trigger area and a nozzle engagement member for operating the nozzle member in response to movement of the trigger area;

wherein the actuator arrangement is constructed and arranged to operate the light beam generator when the trigger arrangement is in an initial position wherein, when the trigger arrangement is in the initial position, the nozzle engagement member is moved an amount insufficient to operate the nozzle member, for directing at least one light beam toward the surface before the liquid is discharged through the nozzle member, and wherein the trigger arrangement is further movable to a spray position in which the nozzle engagement member is positioned so as to operate the nozzle member to discharge liquid from the spray container toward the surface through the nozzle member, wherein the actuator arrangement is constructed and arranged to continue operation of the light beam generator when the trigger arrangement is in the spray position.

11. A spray container positioning device for use in positioning a spray container relative to a surface, comprising:

a light beam positioning arrangement for projecting at least one light beam toward the surface, for use in positioning the spray container and nozzle member relative to the surface, wherein the light beam positioning arrangement includes a light beam generator and an actuator arrangement for selectively operating the light beam generator, wherein the light beam generator is contained within a housing and wherein the actuator arrangement comprises a switch associated with the housing; and a spray container mounting structure in association with the light beam positioning arrangement adapted for supporting the light beam positioning arrangement on the spray container, wherein the spray container mounting structure is configured to attach to the spray container.

12. In a spray container operating mechanism releasably engageable with a spray container having a selectively operable nozzle member for discharging liquid contained within the spray container toward a surface in a spray pattern, wherein the spray container operating mechanism includes a movable trigger mechanism selectively engageable with the nozzle member, the improvement comprising a light beam generator interconnected with the spray container operating mechanism, wherein the light beam generator generates a linear light beam, and wherein the light beam generator is configured to direct the linear light beam to strike the surface within the spray pattern, wherein the linear light beam defines a point of light within the spray pattern upon striking the surface to provide a reference point for the user in determining the position of the spray container and nozzle member relative to the surface.

13. In a spray container operating mechanism releasably engageable with a spray container having a selectively operable nozzle member for discharging liquid contained within the spray container toward a surface, wherein the spray container operating mechanism includes a movable trigger mechanism selectively engageable with the nozzle member, the improvement comprising a light beam generator interconnected with the spray container operating mechanism for directing at least one light beam toward the surface, wherein the light beam provides a visual indication of the position of the spray container and nozzle member relative to the surface, wherein the light beam generator is operable in response to an actuator arrangement, wherein the actuator arrangement interfaces with the movable trigger mechanism for operating the light beam generator in response to movement of the trigger mechanism.

14. The improvement of claim 13, wherein the actuator arrangement includes a movable contact member interconnected between the light beam generator and a power supply, wherein the movable contact member is movable in response to movement of the trigger mechanism.

15. In a spray container operating mechanism releasably engageable with a spray container having a selectively operable nozzle member for discharging liquid contained within the spray container toward a surface, wherein the spray container operating mechanism includes a movable trigger mechanism selectively engageable with the nozzle member, the improvement comprising a light beam generator interconnected with the spray container operating mechanism for directing at least one light beam toward the surface, wherein the light beam provides a visual indication of the position of the spray container and nozzle member relative to the surface, and wherein the light beam generator is operable to direct a pair of convergent light beams toward the surface.

16. The improvement of claim 12, wherein the light beam generator is contained within a housing, and wherein the spray container operating mechanism includes a series of walls, wherein the light beam generator housing is releasably engageable with at least one of the walls of the spray container operating mechanism.

17. In a spray container operating mechanism releasably engageable with a spray container having a selectively operable nozzle member for discharging liquid contained within the spray container toward a surface, wherein the spray container operating mechanism includes a movable trigger mechanism selectively engageable with the nozzle member, the improvement comprising a light beam generator interconnected with the spray container operating mechanism for directing at least one light beam toward the surface to provide a visual indication of the position of the spray container and nozzle member relative to the surface, wherein the light beam generator is contained within a housing, and wherein the spray container operating mechanism includes a series of walls, wherein the light beam generator housing is releasably engageable with at least one of the walls of the spray container operating mechanism, and wherein the light beam generator housing is releasably engageable with at least one of the walls of the spray container operating mechanism in two or more positions.

18. A method of positioning a spray container relative to a surface, wherein the spray container includes a nozzle member for discharging liquid contained within the spray container toward a surface in a spray pattern, comprising the steps of:

mounting a light beam generator to the spray container, wherein the light beam generator is operable to generate a linear light beam;

directing the linear light beam from the light beam generator toward the surface such that the linear light beam strikes the surface within the spray pattern, wherein the linear light beam defines a point of light within the spray pattern upon striking the surface to provide a reference point for the user in determining the position of the spray container and nozzle relative to the surface; and depressing the nozzle member to discharge liquid from the spray container toward the surface in the spray pattern while judging the position of the spray container and nozzle relative to the surface using the point of light within the spray pattern that is defined by the linear light beam striking the surface.

19. A method of positioning a spray container relative to a surface, wherein the spray container includes a nozzle member for discharging liquid contained within the spray container toward a surface, comprising the steps of:

mounting a light beam generator to the spray container;

directing at least one light beam from the light beam generator toward the surface, wherein the at least one light beam provides a visual indication of the position of the spray container and nozzle relative to the surface; and depressing the nozzle member to discharge liquid from the spray container toward the surface while maintaining the position of the spray container and nozzle a predetermined distance from the surface as indicated by the at least one light beam;

wherein the light beam generator is contained within a housing, and further comprising the step of varying the position of the light beam generator housing relative to the spray container for varying the orientation of the at least one light beam relative to the spray container.

20. A method of positing a spray container relative to a surface, wherein the spray container includes a nozzle member for discharging liquid contained within the spray container toward a surface, comprising the steps of:

mounting a light beam generator to the spray container;

directing at least one light beam from the light beam generator toward the surface, wherein the at least one light beam provides a visual indication of the position of the spray container and nozzle relative to the surface; and depressing the nozzle member to discharge liquid from the spray container toward the surface while maintaining the position of the spray container and nozzle a predetermined distance from the surface as indicated by the at least one light beam;

wherein the step of directing at least one light beam toward the surface is carried out by generating a pair of light beams which converge in a direction toward the surface, wherein the point of convergence of the light beams corresponds to an optimal distance of the spray container from the surface during spraying of the liquid from the spray container onto the surface through the nozzle member.

21. The method of claim 18, wherein the step of mounting the light beam generator to the spray container is carried out by releasably securing a mounting device to a side wall defined by the spray container.

22. The method of claim 21, wherein the step of releasably securing the mounting device to the spray container includes releasably engaging a base member with the spray container side wall, wherein the light beam generator is carried by the base member.

23. The method of claim 22, wherein the base member is releasably engaged with the spray container side wall by means of a flexible retaining member engaged with the base member, wherein the base member and the flexible retaining member encircle the spray container side wall.

24. A method of positioning a spray container relative to a surface, wherein the spray container includes a nozzle member for discharging liquid contained within the spray container toward a surface in a spray pattern, comprising the steps of:
engaging a handle arrangement with the spray container, wherein the handle arrangement includes a manually operable trigger mechanism for selectively actuating the nozzle member to discharge liquid from the spray container toward the surface; and
directing at least one linear light beam toward the surface so that the linear light beam strikes the surface within the spray pattern, wherein the at least one linear light beam defines a point of light within the spray pattern upon striking the surface to provide a reference point for the user in determining the position of the spray container and nozzle relative to the surface.

25. The method of claim 24, wherein the step of directing at least one linear light beam toward the surface is carried out by actuating a light beam generator associated with the handle arrangement.

26. A method of positioning a spray container relative to a surface, wherein the spray container includes a nozzle member for discharging liquid contained within the spray container toward a surface, comprising the steps of:
engaging a handle arrangement with the spray container, wherein the handle arrangement includes a manually operable trigger mechanism for selectively actuating the nozzle member to discharge liquid from the spray container toward the surface; and
directing at least one light beam toward the surface, wherein the at least one light beam provides a visual indication of the position of the spray container and nozzle relative to the surface, wherein the step of directing at least one light beam toward the surface is carried out by actuating a light beam generator associated with the handle arrangement; and
wherein the step of directing at least one light beam toward the surface is carried out by operating the light beam generator in response to operation of the trigger mechanism of the handle arrangement.

27. The method of claim 26, wherein the step of directing at least one light beam toward the surface is carried out by first directing the at least one light beam toward the surface by initial operation of the trigger mechanism prior to discharging liquid from the spray container through the nozzle member, and subsequently continuing to direct the at least one light beam toward the surface when the trigger mechanism is operated so as to actuate the nozzle member to discharge liquid from the spray container onto the surface.

28. A method of positioning a spray container relative to a surface, wherein the spray container includes a nozzle member for discharging liquid contained within the spray container toward a surface, comprising the steps of:
engaging a handle arrangement with the spray container, wherein the handle arrangement includes a manually operable trigger mechanism for selectively actuating the nozzle member to discharge liquid from the spray container toward the surface; and
directing at least one light beam toward the surface, wherein the at least one light beam provides a visual indication of the position of the spray container and nozzle relative to the surface, wherein the step of directing at least one light beam toward the surface is carried out by actuating a light beam generator associated with the handle arrangement;
wherein the light beam generator is contained within a housing, and further comprising the step of varying the position of the light beam generator housing relative to the handle arrangement for varying the orientation of the at least one light beam relative to the spray container.

29. A method of positioning a spray container relative to a surface, wherein the spray container includes a nozzle member for discharging liquid contained within the spray container toward a surface, comprising the steps of:
engaging a handle arrangement with the spray container, wherein the handle arrangement includes a manually operable trigger mechanism for selectively actuating the nozzle member to discharge liquid from the spray container toward the surface; and
directing at least one light beam toward the surface, wherein the at least one light beam provides a visual indication of the position of the spray container and nozzle relative to the surface;
wherein the step of directing at least one light beam toward the surface is carried out by generating a pair of light beams which converge in a direction toward the surface, wherein the point of convergence of the light beams corresponds to an optimal distance of the spray container from the surface during spraying of the liquid from the spray container onto the surface through the nozzle member.

* * * * *